United States Patent
Ishida

(10) Patent No.: US 8,030,392 B2
(45) Date of Patent: Oct. 4, 2011

(54) RUBBER COMPOSITION FOR SIDEWALL AND TIRE

(75) Inventor: Hirokazu Ishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 10 days.

(21) Appl. No.: 12/561,614

(22) Filed: Sep. 17, 2009

(65) Prior Publication Data

US 2010/0093916 A1 Apr. 15, 2010

(30) Foreign Application Priority Data

Oct. 14, 2008 (JP) .................. 2008-264948

(51) Int. Cl.
*C08K 3/34* (2006.01)
*B60C 1/00* (2006.01)
(52) U.S. Cl. .......... 524/492; 524/571; 152/525
(58) Field of Classification Search .......... 524/492, 524/495, 571; 152/525
See application file for complete search history.

(56) References Cited

U.S. PATENT DOCUMENTS

2008/0149248 A1 * 6/2008 Zanzig et al. ............ 152/525

FOREIGN PATENT DOCUMENTS

| JP | 2002-012706 A | | 1/2002 |
|----|---------------|---|--------|
| JP | 2004-106796 A | | 4/2004 |
| JP | 2005-68208 A | | 3/2005 |
| JP | 2006-063143 | * | 3/2006 |
| JP | 2006-63143 A | | 3/2006 |
| JP | 2007-182100 A | | 7/2007 |
| JP | 2007-284575 A | | 11/2007 |

* cited by examiner

*Primary Examiner* — Ling Choi
(74) *Attorney, Agent, or Firm* — Birch, Stewart, Kolasch & Birch, LLP

(57) ABSTRACT

A rubber composition for sidewall contains 10 to 40 mass % syndiotactic-1,2-polybutadiene-containing polybutadiene rubber and 10 to 30 mass % tin-modified polybytadiene rubber in a polymer component, and contains 10 to 40 parts by mass silica with respect to 100 parts by mass polymer component. Thus, cut resistance and ozone resistance as well as fuel efficiency of a car can be improved.

6 Claims, No Drawings ature of the present invention when taken in conjunction with the accompanying drawings.
RUBBER COMPOSITION FOR SIDEWALL AND TIRE This nonprovisional application is based on Japanese Patent Application No. 2008-264948 filed with the Japan Patent Office on Oct. 14, 2008, the entire contents of which are hereby incorporated by reference.

FIELD OF THE INVENTION

The present invention relates to a rubber composition for sidewall and a tire with a sidewall including the rubber composition, particularly a tire for a truck and a bus.

DESCRIPTION OF THE BACKGROUND ART

As preservation of environments in addition to energy saving has particularly been required in recent years, development of a technique for achieving higher fuel efficiency of a vehicle has become an important issue. As decrease in a rolling resistance of a tire represents one requirement for fuel efficiency, various studies have been conducted in the field of the art.

Regarding a technique for achieving higher fuel efficiency in connection with a sidewall of a tire, decrease in an amount of a reinforcing agent such as carbon black blended in the sidewall or use of carbon black having a large particle size is most effective. In many cases, however, such measures lead to lower physical properties representative of hardness, such as hardness or modulus, of a mixture of rubber. Namely, when a tire is attached to a car and used, resistance to flaw lowers.

Japanese Patent Laying-Open No. 2004-106796 discloses a rubber composition containing polybutadiene rubber including a large amount of a linear component, as a rubber composition for sidewall for a tire for a passenger car that can achieve lower rolling resistance of a tire.

Japanese Patent Laying-Open No. 2006-063143 discloses a rubber composition containing polybutadiene rubber including 1,2-syndiotactic polybutadiene crystals and tin-modified polybutadiene rubber, as a rubber composition achieving both cut resistance and high fuel efficiency.

Meanwhile, a rubber composition capable of achieving both high fuel efficiency and improved appearance has been desired.

SUMMARY OF THE INVENTION

An object of the present invention is to provide a rubber composition for sidewall achieving improved cut resistance and ozone resistance as well as high fuel efficiency of a car.

The present invention is directed to a rubber composition for sidewall, containing 10 to 40 mass % syndiotactic-1,2-polybutadiene-containing polybutadiene rubber and 10 to 30 mass % tin-modified polybutadiene rubber in a polymer component, and containing 10 to 40 parts by mass silica with respect to 100 parts by mass polymer component above.

Preferably, in the rubber composition for sidewall according to the present invention, the polymer component further contains 40 to 60 mass % natural rubber.

Preferably, the rubber composition for sidewall according to the present invention contains 0.5 to 3 parts by mass silane coupling agent with respect to 100 parts by mass silica above.

In addition, the present invention is further directed to a tire manufactured with the rubber composition for sidewall above.

The rubber composition according to the present invention can achieve improved cut resistance and ozone resistance as well as high fuel efficiency of a car, by containing a prescribed amount of syndiotactic-1,2-polybutadiene-containing polybutadiene rubber, tin-modified polybutadiene rubber, and silica as blended.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A rubber composition for sidewall according to the present invention contains polymer components containing syndiotactic-1,2-polybutadiene-containing polybutadiene rubber and polybutadiene rubber, and silica.

<Syndiotactic-1,2-Polybutadiene-Containing Polybutadiene Rubber>

The rubber composition for sidewall according to the present invention contains syndiotactic-1,2-polybutadiene-containing polybutadiene rubber (hereinafter, also referred to as "VCBR"), so that a rubber composition having high hardness and low exothermic property can be obtained. In addition, as VCBR is contained, a rubber composition high in hardness can be obtained even though an amount of carbon black is decreased and silica is added.

In the syndiotactic-1,2-polybutadiene-containing polybutadiene rubber used in the present invention, the polybutadiene rubber containing 1,2-syndiotactic polybutadiene crystals is not such that 1,2-syndiotactic polybutadiene crystals are simply dispersed in the polybutadiene rubber, but preferably such that the crystals chemically bonded to the polybutadiene rubber are dispersed therein. As the crystals chemically bonded to the rubber component are dispersed, it is likely that generation and propagation of a crack is suppressed.

The 1,2-syndiotactic polybutadiene crystals have a melting point preferably not lower than 180° C. and more preferably not lower than 190° C. When the melting point is lower than 180° C., crystals are molten during vulcanization of a tire in pressing and hardness tends to lower. In addition, the 1,2-syndiotactic polybutadiene crystals have a melting point preferably not higher than 220° C. and more preferably not higher than 210° C. When the melting point exceeds 220° C., a molecular weight of VCBR becomes great and dispersion property in the rubber composition tends to deteriorate.

The content of a boiling n-hexane insoluble in VCBR is preferably not lower than 2.5 mass % and more preferably not lower than 8 mass %. When the content is less than 2.5 mass %, sufficient hardness of the rubber composition may not be obtained. In addition, the content of the boiling n-hexane insoluble in VCBR is preferably not higher than 22 mass %, more preferably not higher than 20 mass %, and further preferably not higher than 18 mass %. When the content exceeds 22 mass %, viscosity of VCBR itself is high and dispersion property of VCBR and a filler in the rubber composition tends to deteriorate. Here, the boiling n-hexane insoluble refers to 1,2-syndiotactic polybutadiene (SPBD) in VCBR.

The content of 1,2-syndiotactic polybutadiene crystals in VCBR is not lower than 2.5 mass % and preferably not lower than 10 mass %. When the content is less than 2.5 mass %, hardness is insufficient. In addition, the content of 1,2-syndiotactic polybutadiene crystals in VCBR is not higher than 20 mass % and preferably not higher than 18 mass %. When the content exceeds 20 mass %, dispersion of VCBR in the rubber composition becomes difficult and processability deteriorates.

The content of VCBR in the polymer component is not lower than 10 mass % and preferably not lower than 20 mass %. When the content is less than 10 mass %, cut resistance and resistance to crack extension are poor. In addition, the content of VCBR is not higher than 40 mass % and preferably not higher than 30 mass %. When the content exceeds 40 mass %, tensile strength at break of the rubber composition is low and cut resistance and resistance to crack extension are poor.

<Tin-Modified Polybutadiene Rubber>

As the rubber composition for sidewall according to the present invention contains tin-modified polybutadiene rubber, higher fuel efficiency can be achieved.

Preferably, tin-modified polybutadiene rubber (tin-modified BR) used in the present invention is obtained by polymerizing 1,3-butadiene with the use of a lithium initiator and thereafter adding a tin compound, and a terminal end of a tin-modified BR molecule is bonded by tin-carbon bond.

Examples of the lithium initiator include lithium-based compounds such as alkyllithium, aryllithium, allyllithium, vinyllithium, organotin lithium, and an organic nitrogen lithium compound. By adopting the lithium-based compound as the initiator for tin-modified BR, high-vinyl- and low-cis-content tin-modified BR can be fabricated.

Examples of tin compounds include tin tetrachloride, butyltin trichloride, dibutyltin dichloride, dioctyltin dichloride, tributyltin chloride, triphenyltin chloride, diphenyl dibutyl tin, triphenyltin ethoxide, diphenyldimethyltin, ditolyltin chloride, diphenyltin dioctanoate, divinyldiethyltin, tetrabenzyl tin, dibutyltin distearate, tetraallyltin, p-tributyltin styrene, and the like, and one, or two or more from among the above can be selected for use.

The content of tin atoms in tin-modified BR is not lower than 50 ppm and preferably not lower than 60 ppm. When the content is lower than 50 ppm, an effect to accelerate dispersion of carbon black in tin-modified BR is low and tan δ deteriorates. In addition, the content of tin atoms is not higher than 3000 ppm, preferably not higher than 2500 ppm, and further preferably not higher than 250 ppm. When the content exceeds 3000 ppm, a kneaded product does not sufficiently come together and an edge thereof is not straightened, which results in poor extrusion property of the kneaded product.

Molecular-weight distribution (Mw/Mn) of tin-modified BR is not higher than 2 and preferably not higher than 1.5. When Mw/Mn exceeds 2, dispersion property of carbon black and tan δ deteriorate.

A bound vinyl content in tin-modified BR is not lower than 5 mass % and preferably not lower than 7 mass %. When the content is less than 5 mass %, polymerization (manufacturing) of tin-modified BR is difficult. In addition, the bound vinyl content is not higher than 50 mass % and preferably not higher than 20 mass %. When the bound vinyl content exceeds 50 mass %, resistance to abrasion (wear resistance in rubbing of the sidewall against the outside) significantly deteriorates.

The content of tin-modified BR in the rubber component is not lower than 10 mass % and preferably not lower than 15 mass %. When the content is less than 10 mass %, tan δ becomes high, which is not preferred. In addition, the content of tin-modified BR is not higher than 30 mass % and preferably not higher than 25 mass %. When the content exceeds 30 mass %, tensile strength lowers, which is not preferred.

<Other Polymer Components>

The rubber composition for sidewall according to the present invention may contain not only syndiotactic-1,2-polybutadiene-containing polybutadiene rubber and tin-modified polybutadiene rubber but also natural rubber (NR), isoprene rubber (IR), styrene-butadiene rubber (SBR), high cis 1,4-polybutadiene rubber other than VCBR and tin-modified BR, and the like. Among others, natural rubber is preferably contained, as it has excellent tensile strength.

When natural rubber is contained as another polymer component, the content of the natural rubber in the polymer component is not lower than 40 mass % and preferably not lower than 45 mass %. When the content is less than 40 mass %, sufficient tensile strength cannot be obtained. In addition, the content of the natural rubber in the rubber component is not higher than 60 mass % and preferably not higher than 55 mass %. When the content exceeds 60 mass %, the total content of VCBR and tin-modified BR is 40 mass % or lower, and lowering in tan δ and improvement in hardness cannot be achieved.

By employing the polymer components containing VCBR, tin-modified BR and natural rubber above as combined, fuel efficiency can significantly be improved without lowering resistance to flexion and cut resistance of the rubber composition for sidewall.

<Silica>

The rubber composition for sidewall according to the present invention can achieve higher fuel efficiency by containing 10 to 40 parts by mass silica with respect to 100 parts by mass polymer component. In addition, elongation of a part of silica that has not reacted with a silane coupling agent below brings about improvement in cut resistance and ozone resistance of the rubber composition for sidewall. In addition, as silica that has not reacted with the silane coupling agent retards a rate of transfer of an antioxidant to a surface, the antioxidant can remain even after use for a long term, while maintaining its effectiveness. Moreover, good appearance of the tire can also be prevented from being impaired due to transfer of the antioxidant to the tire surface which leads to discoloration of the tire.

Silica having a specific surface area of nitrogen adsorption in a range from $100 \, m^2/g$ to $140 \, m^2/g$, determined with a BET method, is preferably used as silica. For example, silica (anhydrous silicic acid) obtained with a dry method and/or silica (hydrous silicic acid) obtained with a wet method may be employed. Among others, silica obtained with a wet method is preferably employed. When the specific surface area of nitrogen adsorption of silica is less than $100 \, m^2/g$, fracture strength after vulcanization tends to be low. When the specific surface area of nitrogen adsorption exceeds $140 \, m^2/g$, processibility tends to deteriorate. The specific surface area of nitrogen adsorption of silica, determined with the BET method, can be determined with a method complying with ASTM-D-4820-93.

<Silane Coupling Agent>

The rubber composition for sidewall according to the present invention preferably contains 0.5 to 3 parts by mass silane coupling agent with respect to 100 parts by mass silica above. When the content of the silane coupling agent is 3 parts by mass or lower, a part of silica that does not react with the silane coupling agent remains and this part has elongation property. Thus, cut resistance and ozone resistance of the rubber composition for sidewall as well as fuel efficiency are improved.

Bis-(3-triethoxysilylpropyl)-disulfide or the like is preferably used as the silane coupling agent.

<Other Components>

The rubber composition according to the present invention may optionally contain chemicals including: a reinforcing filler such as carbon black, calcium carbonate and clay; a softener such as an aromatic oil; a wax; an antioxidant; stearic acid; zinc oxide; a vulcanizer such as sulfur; and a vulcanization accelerator, in addition to the polymer component, silica and the silane coupling agent above.

<Method of Manufacturing Rubber Composition for Sidewall and Tire>

According to the rubber composition for sidewall of the present invention, the polymer component, silica, and optional various chemicals above are blended and kneaded, to obtain an unvulcanized rubber composition. This unvulcanized rubber composition is extruded to conform to a shape of the sidewall of the tire, so that an unvulcanized tire is formed on a tire molding machine. In addition, the unvulcanized tire can be heated and pressurized in a vulcanizing machine to obtain a tire.

Examples 1 to 4 and Comparative Examples 1 to 4

Fabrication of Tire

Various chemicals including polymers other than a vulcanizing filler such as sulfur and a vulcanization accelerator were kneaded in a BR-type Banbury mixer in accordance with formulation in Table 1. A vulcanizing filler was then added to the kneaded product and mixed in an 8-inch roll, to obtain an unvulcanized rubber composition. The obtained unvulcanized rubber composition was formed into the shape of the sidewall and bonded together with other tire members on the tire molding machine to form the unvulcanized tire, and the tire was subjected to press vulcanization for 40 minutes under a condition of 150° C., to manufacture test tires (size: 11R22.5 14P) according to Examples 1 to 4 and Comparative Examples 1 to 4. The following measurement was conducted, using the obtained tires.

(Rolling Resistance Index)

A rolling resistance tester manufactured by Kobe Steel Ltd. was used to measure a rolling resistance under such conditions that the tire was run under a load of 30N at a speed of 80 km/h, with a tire internal pressure being set to 200 kPa. A reciprocal of a measurement value was calculated, and a result was indicated with an index, with the result in Example 1 being defined as 100 (reference). A greater index indicates small rolling resistance and high fuel efficiency.

(Cut Resistance Index)

A cut resistance index pendulum impact cutting tester with a blade made of steel and having a width of 20 mm was used to leave a flaw in a sidewall portion, and a depth of the flaw was represented as an index, with the result in Example 1 being defined as 100. A greater index indicates excellent cut resistance.

(Resistance to Discoloration)

The manufactured tires were left outdoors for 180 days, so as not to get wet by rainwater. Thereafter, appearance was visually observed and evaluated on a scale from 1 to 5.

5: No discoloration

4: Slight discoloration in part

3: Discoloration in part or slight discoloration in ½ or more of tire

2: Discoloration in ½ of tire or slight discoloration in entire tire

1: Discoloration in entire tire.

(Ozone Resistance Test)

The manufactured tires were left for 72 hours under such conditions that a temperature was set to 40° C., ozone concentration was set to 50 ppm, and an elongation percentage was set to 20%, under JIS K 6259 "method of determining ozone resistance—vulcanized rubber and thermoplastic rubber," and a state of a crack in the sidewall of the tire was evaluated.

5: No crack was observed with naked eyes.

4: Crack(s) barely observed with naked eyes was (were) present.

3: A few shallow cracks that could be observed with naked eyes were present.

2: A great number of moderate cracks that could be observed with naked eyes were present.

1: A great number of large and deep cracks that could be observed with naked eyes were present.

Results of measurement are shown in Table 1.

TABLE 1

| Blended Agent | Example | | | | Comparative Example | | | |
| --- | --- | --- | --- | --- | --- | --- | --- | --- |
|  | 1 | 2 | 3 | 4 | 1 | 2 | 3 | 4 |
| NR | 60 | 60 | 50 | 50 | 40 | 60 | 60 | 60 |
| Tin-Modified BR | 30 | 20 | 20 | 10 | 50 | 0 | 20 | 20 |
| VCBR | 10 | 20 | 30 | 40 | 10 | 40 | 20 | 20 |
| Carbon Black (CB) | 30 | 20 | 10 | 5 | 30 | 5 | 50 | 0 |
| Silica | 10 | 20 | 30 | 40 | 10 | 40 | 0 | 50 |
| Silane Coupling Agent | 0.3 | 0.6 | 0.9 | 1.2 | 0.3 | 1.2 | 0 | 1.5 |
| Zinc Oxide | 3 | 3 | 3 | 3 | 3 | 3 | 3 | 3 |
| Stearic Acid | 2 | 2 | 2 | 2 | 2 | 2 | 2 | 2 |
| Antioxidant | 4 | 4 | 5 | 6 | 4 | 6 | 4 | 6 |
| Wax | 1.5 | 1.5 | 1.5 | 1.5 | 1.5 | 1.5 | 1.5 | 1.5 |
| Resin | 3 | 3 | 3 | 3 | 3 | 3 | 3 | 3 |
| Sulfur | 1.5 | 1.5 | 1.5 | 1.5 | 1.5 | 1.5 | 1.5 | 1.5 |
| Accelerator | 0.8 | 0.8 | 0.8 | 0.8 | 0.8 | 0.8 | 0.8 | 0.8 |
| Rolling Resistance Index | 100 | 106 | 117 | 108 | 110 | 92 | 95 | 120 |
| Cut Resistance Index | 100 | 100 | 100 | 100 | 85 | 80 | 105 | 70 |
| Resistance to Discoloration | 3 | 3 | 5 | 5 | 3 | 5 | 3 | 5 |
| Resistance to Ozone | 3 | 3 | 4 | 5 | 2 | 4 | 1 | 4 |

NR: RSS#3

Tin-modified BR: BR 1250 manufactured by Zeon Corporation (tin-modified polybutadiene rubber; polymerization was carried out by using lithium as the initiator; vinyl content was set to 10 to 13 mass %; Mw/Mn was set to 1.5; and the content of tin atoms was set to 250 ppm)

VCBR: VCR 412 manufactured by Ube Industries Ltd. (syndiotactic-1,2-polybutadiene-containing polybutadiene rubber (content of syndiotactic polymer was 12 mass %)

Carbon black (CB): Diablack HM manufactured by Mitsubishi Chemical Corporation (specific surface area of nitrogen adsorption of 78 $m^2/g$)

Silica: ZEOSIL 115GR manufactured by Rhodia (specific surface area of nitrogen adsorption of 120 $m^2/g$)

Silane coupling agent: Si 266 manufactured by Degussa

Zinc oxide: Two types of zinc oxides manufactured by Mitsui Mining & Smelting Co., Ltd.

Stearic acid: Bead stearic acid "Tsubaki™" manufactured by NOF Corporation

Antioxidant: Santoflex 6PPD manufactured by Flexsys K. K.

Wax: Ozoace 0355 manufactured by Nippon Seiro Co., Ltd.

Resin: Marukarez T-100AS manufactured by Maruzen Oil Co., Ltd.

Sulfur: HK-200-5 manufactured by Hosoi Chemical Industry Co., Ltd.

Vulcanization accelerator: Nocceler NS-P manufactured by Ouchi Shinko Chemical Industrial Co., Ltd.

(Evaluation Result)

Example 2 contains 20 mass % syndiotactic-1,2-polybutadiene-containing polybutadiene rubber (VCBR) and 20 mass % tin-modified polybutadiene rubber (tin-modified BR) in the polymer component, and contains 20 parts by mass silica with respect to 100 parts by mass polymer component. Example 2 exhibits rolling resistance, cut resistance, resistance to discoloration, and ozone resistance equivalent to those in Example 1.

Example 3 contains 30 mass % VCBR and 20 mass % tin-modified BR in the polymer component, and contains 30 parts by mass silica with respect to 100 parts by mass polymer component. Example 3 exhibits cut resistance equivalent to that in Example 1 and it is superior thereto in rolling resistance, resistance to discoloration and ozone resistance.

Example 4 contains 40 mass % VCBR and 10 mass % tin-modified BR in the polymer component, and contains 40 parts by mass silica with respect to 100 parts by mass polymer component. Example 4 exhibits cut resistance equivalent to that in Example 1 and it is much superior thereto in rolling resistance, resistance to discoloration and ozone resistance.

Comparative Example 1 contains 50 mass % tin-modified BR in the polymer component. Comparative Example 1 is superior to Example 1 in rolling resistance, however, it is poorer in cut resistance and ozone resistance.

In Comparative Example 2, the polymer component does not contain tin-modified BR. Comparative Example 2 is superior to Example 1 in resistance to discoloration and ozone resistance, however, it is poorer in rolling resistance and cut resistance.

Comparative Example 3 does not contain silica. Comparative Example 3 is superior to Example 1 in cut resistance, however, it is poorer in rolling resistance and ozone resistance.

Comparative Example 4 contains 50 parts by mass silica with respect to 100 parts by mass polymer component. Comparative Example 4 is excellent in rolling resistance, resistance to discoloration and ozone resistance, however, it is extremely poor in cut resistance.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A rubber composition for sidewall, comprising:
   10 to 40 mass % syndiotactic-1,2-polybutadiene-containing polybutadiene rubber and 10 to 30 mass % tin-modified polybutadiene rubber and 40 to 60 mass % natural rubber in a polymer component; and
   10 to 40 parts by mass silica with respect to 100 parts by mass said polymer component.

2. The rubber composition for sidewall according to claim 1, containing 0.5 to 3 parts by mass silane coupling agent with respect to 100 parts by mass said silica.

3. A tire manufactured with the rubber composition for sidewall according to claim 1.

4. A tire manufactured with the rubber composition for sidewall according to claim 2.

5. A tire having a sidewall formed from the rubber composition according to claim 1.

6. A tire having a sidewall formed from the rubber composition according to claim 2.

* * * * *